United States Patent Office 3,672,835
Patented June 27, 1972

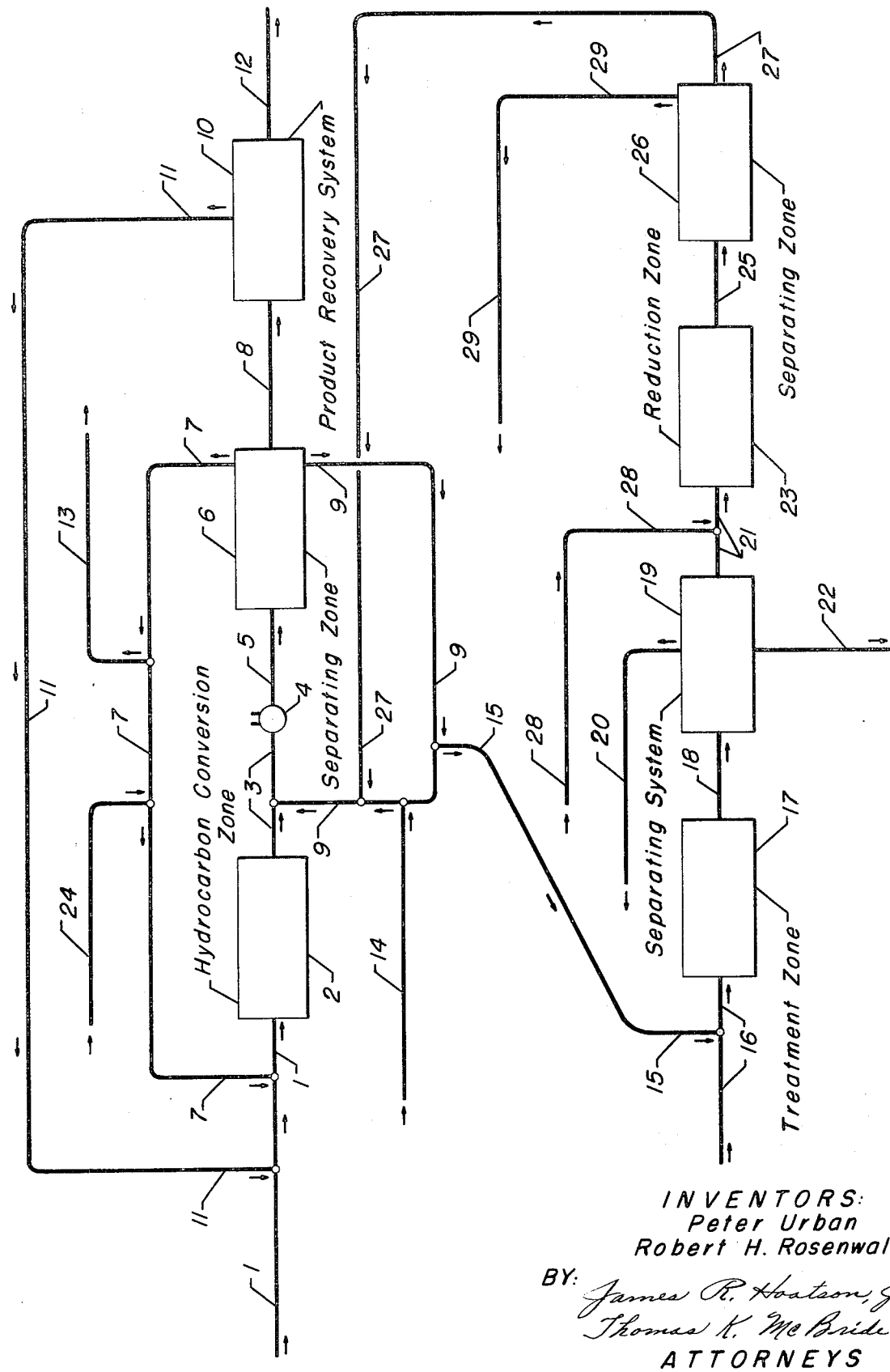

3,672,835
TREATMENT OF AN AQUEOUS WASTE STREAM FROM A HYDROCARBON CONVERSION PROCESS
Peter Urban, Northbrook, and Robert H. Rosenwald, Western Springs, Ill., assignors to Universal Oil Products Company, Des Plaines, Ill.
Filed Aug. 31, 1970, Ser. No. 68,275
The portion of the term of the patent subsequent to Oct. 27, 1987, has been disclaimed
Int. Cl. C01b 17/02
U.S. Cl. 23—224        18 Claims

ABSTRACT OF THE DISCLOSURE

An aqueous waste stream containing $NH_4HS$, which is typically produced in a process for converting a hydrocarbon charge stock containing sulfurous and nitrogenous contaminants, is treated to produce elemental sulfur and a treated water stream suitable for recycle to the hydrocarbon conversion process, by the steps of: (a) catalytically treating the aqueous waste stream with oxygen at oxidizing conditions effective to produce an effluent stream containing $NH_4OH$, $(NH_4)_2S_2O_3$ and elemental sulfur or ammonium polysulfide; (b) separating sulfur from the effluent stream from step (a) to produce an aqueous effluent stream containing $(NH_4)_2S_2O_3$; and (c) treating the aqueous stream from step (b) with carbon monoxide at reduction conditions effective to form a substantially thiosulfate-free treated water stream. Key feature of the treatment method is the use of a carbon monoxide reduction step to enable the continuous recycle of the treated water stream back to the hydrocarbon conversion process with consequential abatement of water pollution problems and substantial reduction of requirements for make-up water.

The subject of the present invention is an improved water treating method which finds utility in combination with a hydrocarbon conversion process where a charge stock containing sulfurous and nitrogenous contaminants is catalytically converted with continuous recovery of at least a portion of the sulfur and ammonia from the products of the hydrocarbon conversion reaction, and where it is desired to operate without causing any substantial water pollution problems. More precisely, the present invention relates to a process for the conversion of a hydrocarbon charge stock containing sulfurous and nitrogenous compounds wherein an aqueous waste stream containing substantial quantities of $NH_3$ and $H_2S$ (typically present as $NH_4HS$) is produced by contacting the effluent from the conversion zone with a water stream. This waste water stream is treated by the method of the present invention to recover elemental sulfur and to produce a treated water stream suitable for recycle to the water-contacting step of the hydrocarbon conversion process in order to remove additional quantities of $NH_3$ and $H_2S$, to abate a substantial pollution problem and to minimize make-up water requirements.

The concept of the present invention developed from our efforts directed towards a solution of a substantial water pollution problem that is caused when a water stream is used to remove ammonium hydrosulfide salts from the effluent equipment train associated with such hydrocarbon conversion processes as hydrorefining, hydrocracking, etc. wherein ammonia and hydrogen sulfide by-products are produced. The original purpose for injecting the water stream into the effluent train of heat transfer equipment associated with these processes was to remove these detrimental salts which if uncontrolled, could clog up the equipment. The waste water stream so-formed presented a substantial pollution hazard insofar as it contains sulfide salts which have a substantial biological oxygen demand and ammonia which is a nutrient that leads to excessive growth of stream vegetation. One solution commonly used in the prior art to control this pollution problem is to strip $NH_3$ and $H_2S$ from this waste water stream with resulting recycle of the stripped water to the effluent equipment. Another solution is to sufficiently dilute the waste water stream so that the concentration of sulfide salts is reduced to a level wherein it is relatively innocuous and to discharge the diluted stream into a suitable sewer. Our approach to the solution to this problem has been directed towards a waste water treatment method which would allow recovery of the commercially valuable elemental sulfur and ammonia directly from this waste water solution by a controlled oxidation method. However, despite careful and exhaustive investigations of alternative methods for direct oxidation of the sulfide salts contained in this waste water stream, we have determined that an inevitable by-product of the oxidation step is ammonium thiosulfate. The presence of ammonium thiosulfate in the treated water stream presents a substantial problem because for efficient control of the water pollution problem and in order to have a minimum requirement for make-up water, it is desired to operate the waste water treating plant with a closed water loop. That is, it is desired to continuously recycle the treated water stream back to the water-contacting step of the hydrocarbon conversion process in order to remove additional quantities of the detrimental sulfide salts. The presence of ammonium thiosulfate in this treated aqueous stream prevents the direct recycling of this stream back to the water-contacting, step primarily because the ammonium thiosulfate can react with hydrogen sulfide contained in the effluent stream from the process to produce elemental sulfur with resulting contamination of the hydrocarbon product stream with free sulfur which can cause severe corrosion problems in the downstream equipment. In addition, ammonium thiosulfate is non-volatile and will contribute to salt formation in the effluent equipment.

We have now found an improved method for treating the aqueous waste stream in order to remove sulfur and $NH_3$ therefrom and to produce a thiosulfate-free water stream which can be directly recycled to the water-contacting step of the hydrocarbon conversion process, thereby avoiding the problem of the contamination of the hydrocarbon product stream with free sulfur. Our improved method essentially involves the use of an oxidation step on the aqueous waste stream in conjunction with a selective reduction step on the aqueous product stream from the oxidation step. Accordingly, it is an essential feature of our method that the aqueous stream containing ammonium thiosulfate recovered from the oxidation step of the waste water treatment procedure is subjected to a reduction step with carbon monoxide in order to reduce the ammonium thiosulfate to ammonium hydrosulfide and water, thereby producing a thiosulfate-free treated water stream. One advantage associated with the use of carbon monoxide as the reducing agent in this reduction step is that it does not require a catalyst. Another is the high selectivity for sulfide induced by carbon monoxide.

It is, accordingly, an object of the present invention to provide an improved treating method which operates on an aqueous waste stream containing $NH_4HS$ produced from a hydrocarbon conversion process to recover elemental sulfur, $NH_3$, and a treated water stream suitable for recycle to the hydrocarbon conversion process. A second object is to eliminate one source of waste water streams that can cause pollution problems in the vicinity of petroleum refineries. A third object is to substantially reduce the requirements for fresh water or make-up water for the operation of a hydrocarbon conversion process wherein hydrogen sulfide and ammonia are produced as by-products. Another object is to provide a waste water treating method for the waste water stream recovered from hydrocarbon conversion processes such as hydrorefining and hydrocracking which produces a treated water stream which can be continuously recycled to the hydrocarbon conversion process—that is, to enable operation in a closed loop fashion with regard to the water stream utilized.

In brief summary, the present invention, in one embodiment, relates to a method of treating an input water stream containing an ammonium sulfide compound to produce elemental sulfur and a treated water stream which is substantially free of ammonium thiosulfate. This input water stream is typically produced in a process for converting a hydrocarbon charge stock containing sulfurous and nitrogenous contaminants wherein this charge stock is subjected to a conversion step resulting in the formation of an effluent stream containing substantially sulfur-free and nitrogen-free hydrocarbons, $NH_3$ and $H_2S$. In this process, this effluent stream is contacted with a water stream and the resulting mixture cooled and separated to produce an aqueous waste stream containing $NH_4HS$ which is the input water stream to the method of the present invention. The first step of the treating method of the present invention involves catalytically treating the aqueous waste stream with oxygen at oxidizing conditions effective to produce an effluent stream containing $NH_4OH$, $(NH_4)_2S_2O_3$ and elemental sulfur or ammonium polysulfide. Sulfur is in the second step, separated from the effluent stream from the first step to produce a water stream containing $(NH_4)_2S_2O_3$. The final step involves treating the aqueous stream from the second step with carbon monoxide at reduction conditions selected to form a substantially thiosulfate-free treated water stream.

In a second embodiment, the method of the present invention encompasses a method as outlines above in the first embodiment wherein the first step comprises contacting the input water stream and oxygen with a phthalocyanine catalyst at oxidizing conditions selected to produce an effluent stream containing $NH_4OH$, $(NH_4)_2S_2O_3$, and elemental sulfur or ammonium polysulfide.

In a third embodiment, the present invention comprises the improved method outlined above in the first embodiment wherein the third step comprises contacting the aqueous stream from the second step and carbon monoxide with a reduction catalyst, comprising cobalt sulfide combined with a carrier material, at reduction conditions selected to form a substantially thiosulfate-free effluent stream.

In a fourth embodiment, the present invention comprises a treating method as described in the first embodiment where a water-immiscible sulfur solvent is also charged to the first step and wherein the second step comprises: separating the effluent stream from the first step into a sulfur solvent phase containing sulfur and an aqueous phase containing $NH_4OH$ and $(NH_4)_2S_2O_3$.

In a preferred embodiment, the present invention comprises a method of treating an input water stream containing $NH_4HS$ to produce elemental sulfur and a substantially thiosulfate-free treated water stream. The first step of this treating method involves contacting the input water stream and an amount of oxygen sufficient to react less than 0.5 mole of oxygen per mole of $NH_4HS$ contained in the input water stream with a phthalocyanine catalyst at oxidizing conditions selected to produce an effluent stream containing ammonium polysulfide, $NH_4OH$, and $(NH_4)_2S_2O_3$. The second step comprises subjecting the effluent stream formed in the first step to polysulfide decomposition conditions effective to produce an overhead stream containing $NH_3$, $H_2S$ and $H_2O$, and an aqueous bottom stream containing elemental sulfur and $(NH_4)_2S_2O_3$. In the third step, sulfur is separated from the bottom stream produced in the second step to form an aqueous stream containing $(NH_4)_2S_2O_3$. The fourth step involves contacting the aqueous stream from the third step and carbon monoxide with a reduction catalyst, comprising cobalt sulfide combined with a carrier material, at reduction conditions, including a temperature of about 70 to about 350° C. and a pressure sufficient to maintain at least a portion of the aqueous stream in the liquid phase to form a substantially thiosulfate-free effluent stream containing $CO_2$, $H_2S$ and an aqueous solution of $NH_4HS$ and $(NH_4)_2CO_3$. In the fifth step, $CO_2$ and $H_2S$ are separated from the effluent stream from the fourth step to produce a treated water stream which is substantially free of $(NH_4)_2S_2O_3$.

Other objects and embodiments are hereinafter disclosed in the following detailed discussion of the input streams, the output streams and the mechanics associated with each of the essential and preferred steps of the present invention.

As indicated above, the method of the present invention is principally utilized in combination with a hydrocarbon conversion process involving the catalytic conversion of a hydrocarbon charge stock containing sulfurous and nitrogenous contaminants. In particular, this treating method can be utilized in conjunction with catalytic petroleum processes which utilize hydrogen in the presence of a hydrocarbon conversion catalyst to react with sulfur and nitrogen compounds contained in the charge stock to produce, inter alia, $H_2S$ and $NH_3$. Generally, in these processes, the hydrocarbon charge stock, containing the sulfurous and nitrogenous contaminants, and hydrogen are passed into contact with a hydrocarbon conversion catalyst, comprising a metallic component selected from the metals and compounds of the transition metals of group VI and group VIII combined with a refractory inorganic oxide carrier material, at conversion conditions, including an elevated temperature and superatmospheric pressure, sufficient to produce an effluent stream containing substantially sulfur-free and nitrogen-free hydrocarbons, hydrogen, $H_2S$ and $NH_3$. One example of a preferred conversion process is the process known in the art as hydrorefining, or hydrodesulfurization. The principal purpose of a hydrorefining process is to desulfurize a hydrocarbon charge stock by a mild treatment with hydrogen which generally is selective enough to saturate olefinic-type hydrocarbons and to rupture carbon-nitrogen and carbon-sulfur bonds but is not severe enough to saturate aromatics. The charge to the hydrorefining process is typically a charge stock boiling in the range of about 100° F. to about 650° F., such as a gasoline boiling range charge stock or a kerosine boiling range charge stock or a heavy naphtha, which charge stock contains minor amounts of sulfurous and nitrogenous contaminants which are to be removed without causing any substantial amount of cracking. The hydrorefining catalyst generally comprises an oxide or sulfide of a group VIII metal, especially an iron group metal, mixed with an oxide or sulfide of a group VIB metal, especially molybdenum or tungsten. These metallic components are preferably combined with a carrier material which generally is characterized as a refractory inorganic oxide such as alumina, silica, zirconia, titania, etc. Mixtures of these refractory inorganic oxides are generally also utilized, especially mixtures of alumina and silica. A preferred hydrorefining catalyst comprises cobalt oxide or sulfide and molybdenum oxide or sulfide combined with an alumina carrier material containing a minor amount of silica. Suitable conditions utilized in the hydrocarbon conversion step of the hydrorefining process are: a temperature in the range of about 700 to about 1000° F., a pressure of about 100 to about 3,000 p.s.i.g., a liquid hourly space velocity of about 1 to about 20 hr.$^{-1}$ and a hydrogen to oil ratio of about 500:1 to about 10,000:1 standard cubic feet of hydrogen per barrel of charge stock.

Another example of the type of conversion process with which the present treating method is preferably utilized is a hydrocracking process. The principal objective of this type of process is not only to effect hydrogenation of the charge stock but also to effect selective cracking or hydrocracking. In general, the hydrocarbon charge stock is a stock boiling above the gasoline range such as straight-run gas oil fractions, lubricating oil, coker gas oils, cycle oils, slurry oils, heavy recycle stocks, crude petroleum oils, reduced and/or topped crude oils, etc. Furthermore, these hydrocarbon charge stocks contain minor amounts of sulfurous and nitrogenous contaminants which may range from about 100 p.p.m. sulfur to 3 or 4 wt. percent sulfur or more; typically, the nitrogen concentration in this charge stock will be substantially less than the sulfur concentration except for some rare charge stocks, such as those derived from some types of shale oil, which contain more nitrogen than sulfur. The hydrocracking catalyst utilized typically comprises a metallic component selected from the transition metals and compounds of metals of group VI and group VIII combined with a refractory inorganic oxide. Particularly preferred metallic components comprise the oxides or sulfides of molybdenum and tungsten from group VI and of iron, cobalt, nickel, platinum and palladium from group VIII. The preferred refractory inorganic oxide carrier material is a composite of alumina and silica, although any of the refractory inorganic oxides mentioned hereinbefore may be utilized as a carrier material if desired. Since it is desired that the catalyst possess a cracking function, the acid activity of these carrier materials may be further enhanced by the incorporation of small amounts of acidic materials such as fluorine and/or chlorine. In addition, in some cases it is advantageous to include within the carrier material a crystalline aluminosilicate either in the hydrogen form or in a rare earth exchanged form. Preferred aluminosilicates are the Type X and Type Y forms of faujasite, although any other suitable aluminosilicate either naturally occurring or synthetically prepared may be utilized if desired. Conditions typically utilized in the hydrocarbon conversion step of a hydrocracking process include: a temperature of about 500 to about 1000° F., a pressure in the range of about 300 to about 5,000 p.s.i.g., a liquid hourly space velocity of about 0.5 to about 15.0 hr.$^{-1}$ and a hydrogen circulation rate of about 1000:1 to about 20,000:1 standard cubic feet of hydrogen per barrel of oil.

Regardless of the details concerning the exact nature of hydrocarbon conversion step, the effluent stream recovered therefrom typically contains substantially sulfur-free and nitrogen-free hydrocarbons, hydrogen, $NH_3$ and $H_2S$. This effluent stream is then admixed with a water stream, in a water-contacting step, prior to any substantial cooling of this effluent stream. Thereafter, the resulting mixture of water, hydrocarbons, $NH_3$ and $H_2S$ is cooled in any suitable cooling means, and then separated, in a suitable separating zone, into a hydrogen-rich gaseous stream, a hydrocarbon-rich liquid product stream and a waste water stream containing $NH_4HS$. As discussed previously, the uniform practice of the prior art has been to admix sufficient water with the effluent stream from the hydrocarbon conversion step upstream of the heat exchange equipment so that the heat exchange equipment can be kept free of ammonium sulfide salts. A principal advantage of the present invention is that the source of a major portion of the water necessary to wash out these ammonium sulfide salts can be derived from the treated water stream produced thereby. The total amount of water utilized is obviously a pronounced function of the amount of $NH_3$ and $H_2S$ in this effluent stream; typically it is about 1 to about 20 or more gallons of water per 100 gallons of oil charged to the hydrocarbon conversion step. The hydrogen-rich gaseous phase is then withdrawn from this separating zone, and a portion of it typically recycled to the hydrocarbon conversion step through suitable compression means. The hydrocarbon-rich liquid product phase is typically withdrawn and passed to a suitable product recovery system which generally, for the type of hydrocarbon conversion processes within the scope of the present invention, comprises a suitable train of fractionating equipment designed to separate this hydrocarbon-rich product stream into a series of desired products, some of which may be recycled. The aqueous phase formed in the separating zone is typically withdrawn to form an aqueous waste stream containing an ammonium sulfide compound which is the input water stream to the treating method of the present invention. This input water stream may, in some cases, contain excess amounts of $NH_3$ relative to the amounts of $H_2S$ absorbed therein, but very rarely will contain more $H_2S$ than $NH_3$ because of the relatively low solubility of $H_2S$ in an aqueous solution containing a ratio of dissolved $H_2S$ to dissolved $NH_3$ greater than about 1:1. Typically, the ammonium sulfide compound contained therein is $NH_4HS$.

The amount of $NH_4HS$ contained in this input water stream may vary over a wide range up to the solubility limit of the sulfide salt in water. Typically, the amount of $NH_4HS$ is about 0.1 to about 20 wt. percent or more of the input water stream. For example, a typical waste water stream from a hydrocracking plant contains 3.7 wt. percent $NH_4HS$.

According to the present invention, the input water stream is passed to an oxidation step wherein it is catalytically treated with oxygen at oxidizing conditions selected to produce an effluent stream containing $NH_4OH$, $(NH_4)_2S_2O_3$ and elemental sulfur or ammonium polysulfide. In some cases, it is advantageous to remove dissolved or entrained oil contained in this input water stream by any suitable scrubbing operation prior to passing it to this oxidation step; however, in most cases this stream can be charged directly to the oxidation step.

The catalyst utilized in this oxidation step can be any suitable solid oxidizing catalyst that is capable of effecting substantially complete conversion of the ammonium hydrosulfide salt contained in this waste stream. Two particularly preferred classes of catalyst for this step are metallic sulfides, particularly iron group metallic sulfides, and metal phthalocyanines. The preferred metallic sulfide catalyst is selected from the group consisting of sulfides of nickel, cobalt, and iron, with nickel being especially preferred. Although it is possible to perform this step with a slurry of the metallic sulfide, it is preferred that the metallic sulfide be combined with a suitable carrier material. Examples of suitable carrier materials are: charcoal, such as wood charcoal, bone charcoal, etc. which may or may not be activated prior to use; refractory inorganic oxides such as alumina, silica, zirconia, kieselghur, bauxite, etc.; activated carbons and other natural or synthetic highly porous inorganic carrier materials. The preferred carrier materials are alumina and activated charcoal or carbon and thus a preferred catalyst is nickel sulfide combined with alumina or activated charcoal. The amount of metallic sulfide combined with the carrier material is preferably sufficient to constitute about 0.1 to about 50 wt. percent of the resulting composite.

Another preferred catalyst for use in this oxidation step is a metal phthalocyanine catalyst combined with a suitable carrier material. Particularly preferred metal phthalocyanine compounds include those of cobalt and vanadium. Other metal phthalocyanine compounds that may be used include those of iron, nickel, copper, molybdenum, manganese, tungsten, and the like. Moreover, any suitable derivative of the metal phthalocyanine and mixtures of phthalocyanines may be employed including the sulfonated derivatives, the carboxylated derivatives and polymeric phthalocyanines. Any of the carrier materials previously mentioned in connection with the metallic sulfide catalyst can be utilized with the phthalocyanine catalyst; however, the preferred carrier material is activated carbon. Hence, a particularly preferred catalyst for use in the oxidation step comprises a cobalt or vanadium phthalocyanine sulfonate combined with an activated carbon carrier material. Additional details as to alternative carrier materials, methods of preparation, and the preferred amounts of catalytic components are given in the teachings of U.S. Pat. No. 3,108,081 for these phthalocyanine catalysts.

Although this oxidation step can be performed according to any of the methods taught in the art for contacting a liquid stream and a gas stream with a solid catalyst, the preferred system involves a fixed bed of the solid catalyst disposed in a treatment zone. The input water stream is then passed therethrough in either upward, radial, or downward flow, and the oxygen stream is passed thereto in either concurrent or countercurrent flow relative to the input water stream. Because one of the products of this oxidation step is elemental sulfur, there is a substantial catalyst contamination problem caused by the deposition of this elemental sulfur on the fixed bed of the catalyst. In general, in order to avoid sulfur deposition on the catalyst, we prefer to operate this step in either of two alternative modes. In the first mode, a sulfur solvent is admixed with the input water stream and charged to the treatment zone in order to effect removal of deposited sulfur from the solid catalyst. Any suitable sulfur solvent may be utilized provided that it is substantially inert to the conditions utilized in the treatment zone and that it dissolved substantial quantities of sulfur. Examples of suitable sulfur solvents are: disulfide compounds such as carbon disulfide, methyldisulfide, ethyldisulfide, etc.; aromatic compounds such as benzene, toluene, xylene, ethylbenzene, etc.; aliphatic paraffins such as pentane, hexane, heptane, etc.; cyclic paraffins such as methylcyclopentane, cyclopentanes, cyclohexane, etc.; alkyl halide compounds such as carbon tetrachloride, methylene chloride, ethylene chloride, chloroform, tetrachloroethane, butyl chloride, propyl bromide, ethyldibromide, chlorobenzene, dichlorobenzene, etc.; and the like solvents. Moreover, mixtures of these solvents may be utilized if desired. A solvent which is particularly effective is an aromatic-rich reformate. In this mode, the preferred operation encompasses the utilization of a sulfur solvent that is substantially immiscible with the input water stream. Furthermore, the solubility of sulfur in the solvent is preferably such that it is markedly greater at a temperature in the range of about 175° F. to about 400° F. than it is in temperautres in the range of about 32° F. to about 170° F. This last preference facilitates removal of sulfur through crystallization if such is desired. Considering all of these requirements, we have found that a preferred sulfur solvent is selected from the group consisting of benzene, toluene, xylene, and mixtures thereof. Another group of preferred sulfur solvents are the halogenated hydrocarbons.

The amount of sulfur solvent utilized in this first mode is a function of the net sulfur production for the particular water stream, the activity and selectivity characteristics of the catalyst selected, and the solubility characteristics of the sulfur solvent. In general, the volumetric ratio of sulfur solvent to input water stream is selected such that there is at least enough sulfur solvent to carry away the net sulfur production from the oxidation reaction. As a practical matter, we have found it convenient to operate at a volumetric ratio substantially in excess of the minimum amount required to strip the sulfur from the catalyst; for example, for input water streams containing about 3 wt. percent ammonium hydrosulfide, we have found that a volumetric ratio of about 0.25 to about 1 volume of sulfur solvent per volume of water stream gives excellent results.

Accordingly, in the first mode of operation of the oxidation step, a sulfur solvent and oxygen are charged in admixture with the input water stream to the treatment zone to produce an effluent stream comprising the sulfur solvent containing dissolved sulfur formed by the oxidation reaction, and water containing $NH_4OH$, $(NH_4)_2S_2O_3$ and, possibly, a minor amount of other oxides of sulfur. This effluent stream is passed to a separating zone where, in the preferred operation in which an immiscible sulfur solvent is utilized, a sulfur solvent phase separating from a treated aqueous phase containing $NH_4OH$ and $(NH_4)_2S_2O_3$. At least a portion of the sulfur solvent phase is then withdrawn from the separating zone and passed to a suitable sulfur recovery zone wherein at least a portion of the dissolved sulfur is removed therefrom by any of the methods known in the art such as crystallization, distillation, etc. A preferred procedure is to distill off sulfur solvent and recover a slurry of molten sulfur from the bottoms of the sulfur recovery zone. The lean sulfur solvent recovered from this sulfur separation step can then be recycled to the oxidation step. It is, of course, understood that it is not necessary to treat all of the sulfur solvent to remove sulfur therefrom; that is, it is only necessary to treat an amount of the rich sulfur solvent sufficient to recover the net sulfur production. In any event, an aqueous phase containing $NH_4OH$ and $(NH_4)_2S_2O_3$ is withdrawn from this separating zone and passed to a stripping zone wherein a portion of the ammonia contained therein is typically removed to produce an aqueous stream containing $(NH_4)_2S_2O_3$. It is to be noted that in some cases it is advantageous to allow a relatively high concentration of $NH_4OH$ to remain in this last stream as the presence of $NH_4OH$ therein facilitates removal of additional amounts of $H_2S$ from the hydrocarbon conversion process. In accordance with the present invention, this last stream is passed to a reduction step, hereinafter described, in order to reduce the minor amount of ammonium thiosulfate contained therein to hydrogen sulfide and water.

The second mode of operation of the oxidation step comprises carefully regulating the amount of oxygen injected into the treatment zone so that oxygen is reacted therein in an amount less than the stoichiometric amount required to oxidize all of the ammonium hydrosulfide in the aqueous waste stream to elemental sulfur. Hence, for this mode it is required that the amount of oxygen reacted in the treatment zone be less than 0.5 mole of $O_2$ per mole of $NH_4HS$, and preferably about 0.25 to about 0.45. The exact value within this range is selected such that sufficient sulfide remains available to react with the net sulfur production—that is to say, this mode of operation requires that sufficient excess sulfide be available to form polysulfide with the elemental sulfur which is the product of the primary oxidation reaction. Since one mole of sulfide will react with many moles of sulfur (i.e. about 4 moles of sulfur per mole of sulfide), it is generally only necessary that a small amount of sulfide remain unoxidized.

In the second mode, an aqueous effluent stream containing ammonium polysulfide, $(NH_4)_2S_2O_3$, $NH_4OH$ and a minor amount of other oxides of sulfur is withdrawn from the oxidation step and passed to a polysulfide decomposition zone wherein the polysulfide compound is decomposed to yield an overhead vapor stream containing $NH_3$, $H_2S$ and $H_2O$ and an aqueous bottom stream containing elemental sulfur, $(NH_4)_2S_2O_3$; and typically some $NH_4OH$. The preferred method for decomposing the polysulfide solution involves subjecting it to conditions, including a temperature in the range of about 100° F. to about 350° F. sufficient to form an overhead stream containing $NH_3$, $H_2S$ and $H_2O$ and a bottoms stream comprising elemental sulfur in admixture with an aqueous stream containing $(NH_4)_2S_2O_3$. In most cases, it is advantageous to accelerate the polysulfide decomposition reaction by stripping $H_2S$ from the polysulfide solution with the aid of a suitable inert gas such as steam, air, flue gas, etc., which can be injected into the bottom of the decomposition zone. When this bottoms stream contains a slurry of sulfur, it is then subjected to any of the techniques taught in the art for removing a solid from a liquid such as filtration, settling, centrifuging, etc. to remove the elemental sulfur therefrom. In some cases, this bottoms stream will contain molten sulfur which can be separated by a suitable sulfur settling step. The resulting aqueous stream separated from the sulfur contains a minor amount of $(NH_4)_2S_2O_3$, and in accordance with the present invention is subjected to the reduction step as is hereinafter described. As noted above, it is advantageous to allow some $NH_4OH$ to remain in this last stream. In the case where the bottom temperature of the decomposition zone is maintained above the melting point of sulfur, the separation of elemental sulfur from the aqueous recycle stream can be performed, if desired, within the decomposition zone by allowing a liquid sulfur phase to form at the bottom of this zone, and separately drawing off the aqueous stream and a liquid sulfur stream.

An essential reactant for both modes of operation of this oxidation step is oxygen. This may be present in any suitable form either by itself or mixed with an inert gas. In general, it is preferred to utilize air to supply the necessary oxygen. As indicated hereinbefore in the second mode, the amount of oxygen reacted is less than stoichiometric amount required to oxidize all of the ammonium hydrosulfide to elemental sulfur. In the first mode of operation, wherein a sulfur solvent is utilized, the amount of oxygen reacted ordinarily chosen to be slightly greater than the stoichiometric amount necessary to oxidize all sulfide to sulfur; that is, oxygen is generally utilized in the first mode as a mole ratio of about 0.5:1 to about 1.5:1 or more moles of oxygen per mole of ammonium hydrosulfide contained in the input water stream.

Regarding the conditions utilized in the oxidation step of the present invention, it is preferred for both modes of operation to utilize a temperature in the range of about 30° F. up to about 400° F., with a temperature of about 80° F. to about 220° F. yielding best results. In fact, it is especially preferred to operate with a temperature less than 200° F., since this minimizes thiosulfate and sulfate formation. The sulfide oxidation reaction is not too sensitive to pressure and, accordingly, any pressure which maintains the input water stream in the liquid phase may be utilized. In general, it is preferred to operate at superatmospheric pressure in order to facilitate contact between the oxygen and the water stream, and a pressure of about 25 p.s.i.g. to about 75 p.s.i.g. is particularly preferred. Additionally, the liquid hourly space velocity (defined to be the volume rate per hour of charging the input water stream divided by the total volume of the treatment zone containing catalyst) is preferably selected from the range of about 0.5 to about 10 hr.$^{-1}$.

According to the present invention, the water stream containing $(NH_4)_2S_2O_3$, and typically some $NH_4OH$, recovered from the products of the oxidation step is subjected to a reduction step prior to being recycled to the water-contacting step of the hydrocarbon conversion process in order to eliminate non-volatile thiosulfate salts from this stream and in order to prevent the contamination of the hydrocarbon-rich liquid product stream, recovered from the separating zone of the hydrocarbon conversion process with elemental sulfur. This reduction step is effected by treating the thiosulfate-containing aqueous stream recovered from the oxidation step with carbon monoxide at reduction conditions selected to reduce the $(NH_4)_2S_2O_3$ to $NH_4HS$. This reduction step can be carried out without the use of catalyst if desired, although the preferred procedure is to use a catalyst.

An essential feature of this reduction step involves use of carbon monoxide as the reducing agent. The carbon monoxide for use herein may be obtained from any suitable source or may be prepared in any suitable manner. An acceptable carbon monoxide stream is obtained by the partial oxidation of organic materials, and particularly carbon at high temperature with oxygen, air or steam. Likewise, a carbon monoxide stream suitable for use herein can be prepared by the reduction of carbon dioxide by hydrogen, carbon or certain well-known metals at high temperatures. For example, a gas stream containing about 40% carbon monoxide is easily prepared by blowing steam through a bed of coal at an elevated temperature. Another suitable stream is obtained by simultaneously blowing air and steam through a bed of red hot coal to produce a gas stream containing about 30% carbon monoxide. In addition, blast furnace gases resulting from the reduction of iron oxide by red hot coke can be utilized to supply the necessary carbon monoxide stream if desired. Yet another source of a suitable carbon monoxide stream is a stream prepared by passing carbon dioxide and oxygen through charcoal or coke at a temperature greater than about 1,000° C. in order to decompose the $CO_2$ to $CO$. Regardless of the source of the carbon monoxide, it is preferably used herein in an amount sufficient to provide a mole ratio of carbon monoxide to thiosulfate compound of at least 4:1, with best results obtained at a mole ratio of about 5:1 to 10:1 or more. We have observed that the amount of sulfide formed increases with higher mole ratios of carbon monoxide to thiosulfate.

As indicated above, this reduction step can be carried out without the use of a catalyst; however, in many cases it is advantageous to use a reduction catalyst for this reaction. Improved results are obtained when the reaction zone contains materials such as glass beads, particles of charcoal, and particles of activated carbons. Particularly good results are obtained with a catalyst comprising a metallic component selected from the group consisting of the transition metals of groups VI and VIII such as chromium, molybdenum, tungsten, iron, cobalt, nickel, platinum, palladium, etc. Preferred catalysts for the desired reduction reaction comprises a combination of a group VI or a group VIII transition metal component with a porous support such as alumina or activated carbon. Particularly preferred embodiments involve use of catalysts in which the metallic component is present in the form of a metallic sulfide such as cobalt sulfide, or molybdenum sulfide, or tungsten sulfide combined with a carrier material. The preferred carrier materials are activated carbons such as those commercially available under the trade names of Norite, Nuchar, Darco and other similar products. In addition, other conventional natural or synthetic highly porous inorganic carrier materials may be used as the support for the metallic component such as alumina, silica, silica-alumina, etc. Best results are ordinarily obtained with a catalyst comprising cobalt sulfide combined with a carrier material such as relatively small particles of activated carbon. Excellent results are obtained with 10 to 12 mesh activated carbon particles containing about 5 wt. percent of cobalt sulfide. In general, the amount of the metallic component utilized in the catalyst should be sufficient to comprise about 0.1 to about 50% thereof, calculated on a metallic sulfide basis. These metallic catalysts can be prepared according to any of the conventional procedures for combining a metallic component with a carrier material, with an impregnation procedure with a soluble, decomposable compound of the desired group VI or group VIII metal ordinarily giving best results.

This reduction step can be carried out in any suitable manner and in either a batch or a continuous type system. In a batch system, the aqueous solution containing the thiosulfate compound is charged to a reaction zone which is, theerafter, charged with carbon monoxide to the desired pressure level. In the case where a catalyst is utilized in a batch type operation, it is mixed with the reactants in the reaction zone and agitation is supplied to the zone in order to insure intimate contact between the reactants and the catalyst. Even if a catalyst is not utilized in the batch embodiment, it is preferred to vigorously agitate the contents of the reaction zone in order to insure intimate contact between the gas and the liquid phases present therein. In a continuous type system, the thiosulfate-containing aqueous stream is passed into the reaction zone—either in an upward, radial or downward flow with a carbon monoxide stream being simultaneously introduced into the zone in either countercurrent flow relative to the thiosulfate stream. In particular, one embodiment involves downward flow of the thiosulfate stream with countercurrent flow of the carbon monoxide stream. In this continuous system, it is preferred to utilize suitable means in the reaction zone for effecting intimate contact between the liquid stream and the gas stream. Suitable contacting means involve bubble trays, baffles or any of the various packing materials known to those skilled in the art. In the case where a catalyst is utilized in a continuous type system, it is preferably maintained within the reaction zone as a fixed bed of relatively small particles which perform the dual functions of catalyzing the desired reaction and of effecting contact between the gas and liquid streams.

As indicated above, one embodiment of this reduction step involves a continuous system with a countercurrent operation wherein the aqueous stream is passed downflow into the reaction zone containing suitable contacting means. The carbon monoxide stream is then passed through the zone in an upflow manner. This countercurrent operation produces an overhead stream containing hydrogen sulfide, carbon dioxide and unreacted carbon monoxide and a bottom treated water stream which is substantially free of both thiosulfate and sulfide compounds. Thus, the principal advantage associated with this mode of operation is it enables two functions to be performed in the reaction zone: the reduction of the thiosulfate compound and the simultaneous stripping of the sulfide product from the treated water stream. In other embodiments, where a portion of the sulfide product of the reaction remains in the liquid stream withdrawn from the reaction zone, it can be easily removed therefrom by a conventional stripping step or it can be allowed to remain in the treated water stream where it ultimately will be recycled to the oxidation step.

The reaction conditions utilized in this reduction step can be generally characterized as reduction conditions sufficient to effect conversion of thiosulfate to sulfide. The temperature is preferably selected from the range of about 70° C. to about 350° C., with best results obtained at a relatively high temperature of 175 to about 350° C. As indicated hereinbefore, it is an essential feature that this reduction step is conducted under liquid phase conditions, and accordingly the pressure employed must be sufficient to maintain at least a portion of the solution in the liquid phase. Typically, the pressure is selected from the range of about 100 to about 3,000 p.s.i.g. as a function of the reaction temperature in order to maintain the desired liquid phase. Particularly good results are obtained at a temperature of 200° C. and a pressure of 500 p.s.i.g.

In a batch embodiment of this reduction step, the contact time utilized is preferably about ½ to about 5 hours, with best results obtained at 0.75 to about 2.5 hours. In a continuous process, it is preferred to use a liquid hourly space velocity (defined on the basis of the volume charge rate of the thiosulfate solution divided by the volume of the reaction zone in the case where a catalyst is not utilized, and by the volume of the catalyst bed in the case where a catalyst is utilized) in the range of about 0.25 to 10 hrs.$^{-1}$ with best results obtained at about 0.5 to about 3 hours$^{-1}$.

In one preferred embodiment of this reduction step wherein the aqueous stream containing ammonium thiosulfate and the carbon monoxide stream are concurrently contacted with the reduction catalyst, the effluent stream withdrawn from the reduction zone can contain carbon dioxide, hydrogen sulfide, unreacted carbon monoxide, and an aqueous solution containing $NH_4HS$ and $(NH_4)_2CO_3$. The sulfide product of the reduction reaction is typically present as ammonium hydrosulfide or as hydrogen sulfide or a mixture of these, with the amount of ammonium hydrosulfide present therein depending primarily upon the amount of carbon dioxide dissolved in the effluent stream. Carbon dioxide and a portion of the hydrogen sulfide are typically separated from the aqueous effluent stream from the reduction step in a separating zone. If desired, the remaining ammonium sulfide product of the reduction reaction may be removed from the resulting treated water stream by a suitable stripping operation designed to take hydrogen sulfide overhead with recovery of the substantially thiosulfate-free and sulfide-free treated water stream from the bottom of the stripping column. More frequently, the minor amount of ammonium hydrosulfide produced by the reduction reaction is allowed to remain in the treated water stream recovered from the reduction step because it will not significantly affect the capability of this stream to remove additional quantities of $NH_3$ and $H_2S$ from the effluent stream produced by the hydrocarbon conversion step. Likewise, the ammonium carbonate present in this treated water stream can be removed from the treated stream by treatment with lime or it can be allowed to remain in the treated water stream.

Having broadly characterized the essential steps comprising the method of the present invention, reference is now had to the attached drawing for a detailed explanation of an example of a preferred flow scheme employed when the treating method of the present invention is combined with a hydrocracking process. The attached drawing is merely intended as a general representation of the flow scheme employed with no intent to give details about heaters, condensers, pumps, compressors, valves, process control equipment, etc. except where a knowledge of these devices is essential to an understanding of the present invention or would not be self-evident to one skilled in the art. In addition, in order to provide a working example of a preferred mode of the present invention, the attached drawing is discussed with reference to a particularly preferred mode of operation of each of the steps of the present invention and preferred catalyst for use in these steps.

Referring now to the attached drawing, a light gas oil enters the combination process through line 1. This light gas oil is commingled with a cycle stock at the junction of line 11 and line 1 and with a recycle hydrogen stream at the junction of line 7 with line 1. The resulting mixture is then heated via a suitable heating means (not shown) to the desired conversion temperature and then passed into hydrocarbon conversion zone 2. An analysis of the light gas oil shows it to have the following properties: an °API gravity at 60° F. of 25, an initial boiling point of 421° F., a 50% boiling point of 518° F., and an end boiling point of 663° F., a sulfur content of 2.21 wt. percent, and a nitrogen content of 126 wt. p.p.m. Hydrogen is supplied via line 7 at a rate corresponding to a hydrogen circulation rate of 10,000 standard cubic feet of hydrogen per barrel of oil charged to hydrocarbon conversion zone 2. The cycle stock which is being recycled via line 11 is a portion of the 400+ fraction of the product stream which is separated in product recovery system 10 as will be hereinafter explained. The catalyst utilized in zone 2 comprises nickel sulfide combined with a carrier material containing silica and alumina in a weight ratio of about 3 parts silica per part of alumina. The nickel sulfide is present in amounts sufficient to provide about 5 wt. percent nickel in the final catalyst. The catalyst is maintained within zone 2 as a fixed bed of ⅛ inch by ⅙ inch cylindrical pills. The conditions utilized in zone 2 are hydrocracking conditions which include a pressure of about 1500 p.s.i.g., a conversion temperature of about 600° F., and a liquid hourly space velocity of about 2.0 hr.$^{-1}$ based on combined feed.

An effluent stream is then withdrawn from zone 2 via line 3 and commingled with a water stream, in a water-contacting step, at the junction of line 9 with line 3. The resulting mixture is passed into cooling means 4 wherein it is cooled to a temperature of about 100° F. The cooled mixture is then passed via line 5 into separating zone 6 which is maintained at a temperature of about 100° F. and a pressure of about 1450 p.s.i.g. The amount of water injected into line 3 via line 9 is about 5 gallons of water per 100 gallons of oil. As explained hereinbefore, the reason for adding the water on the influent side of cooling means 4 is to insure that it does not become clogged with sulfide salts.

In a separating zone 6, a three-phase system is formed. The gaseous phase comprises hydrogen, hydrogen sulfide and a minor amount of light ends. The oil phase contains a relatively large amount of dissolved $H_2S$. The water phase contains about 5 wt. percent ammonium hydrosulfide with a slight excess of ammonia. The hydrogen-rich gaseous phase is withdrawn via line 7 and a portion of it (about 20 vol. percent) is vented from the system via line 13 in order to prevent build-up of excessive amounts of $H_2S$ in this stream. The remainder of the hydrogen stream is passed via line 7 through compressive means, not shown, and is commingled with additional make-up hydrogen entering the process via line 24 and passed back to hydrocarbon conversion zone 2. The oil phase from separating zone 6 is withdrawn via line 8 and passed to product recovery system 10.

In this case, product recovery system 10 comprises a low pressure separating zone and a suitable train of fractionating means. In the low pressure separating zone, the oil stream is maintained at a pressure of about 100 p.s.i.g. and a temperature of about 100° F. in order to strip out dissolved $H_2S$ from this oil stream. The resulting stripped oil stream is fractionated to recover a gasoline boiling range product stream and a cycle oil comprising the portion of the product stream boiling above 400° F. The gasoline product stream is recovered via line 12 and the cycle oil is recycled to hydrocarbon conversion zone 2 via line 11.

Returning to the aqueous phase formed in separating zone 6, it is withdrawn via line 9 and continuously recycled back to line 3. Additional make-up water is injected through line 14 during start-up of the process. It is a feature of the present invention that the requirement for make-up water is minimized since water is a product of the oxidation step. A drag stream is withdrawn from the water stream flowing through line 9 at the junction of line 9 and line 15. This drag stream is passed via line 15 to line 16 where it is commingled with an air stream and the resulting mixture is passed into treatment zone 17. This drag stream is the input water stream to the method of the present invention.

Treatment zone 17 contains a fixed bed of a solid catalyst comprising cobalt phthalocyanine mono-sulfonate combined with an activated carbon carrier material in an amount such that the catalyst contains 0.5 wt. percent phthalocyanine. The activated carbon granules used as the carrier material are in a size of 30–40 mesh. The ammonium hydrosulfide is present in the input water stream withdrawn from separating zone 6 in an amount of about 5 wt. percent. This stream is charged to treatment zone 17 at a liquid hourly space velocity of about 1 hr.$^{-1}$. The amount of air which is also charged to treatment zone 17 via line 16 is sufficient to react about 0.7 atom of oxygen per atom of sulfide contained in the water stream. As previously explained, this is an amount less than the stoichoiometric amount necessary to convert the sulfide to sulfur, and consequently ammonium polysulfide is formed within treatment zone 17. The conditions utilized in this zone are a temperature of 95° F. and a pressure of 50 p.s.i.g. Because of side reactions, a minor amount of the sulfide contained in the input water stream is oxidized to higher oxides of sulfur, principally $(NH_4)_2S_2O_3$. Depending somewhat upon the life of the catalyst utilized within zone 17, about 1 to about 10% of the ammonium hydrosulfide will be oxidized to $(NH_4)_2S_2O_3$. Accordingly, the effluent stream withdrawn from zone 17 via line 18 contains ammonium polysulfide, $NH_4OH$, $(NH_4)_2S_2O_3$, and a minor amount of nitrogen gas. The stream is passed to separating system 19 which in this case comprises: a gas separator, a polysulfide decomposition zone and a sulfur recovery zone. In the gas separator, the minor amount of nitrogen gas contained in the effluent stream from treatment zone 17 is vented from the system. In the polysulfide decomposition zone, the liquid effluent stream from the gas separator is heated to a temperature of about 280° F. and passed into a distillation column wherein an overhead stream containing $NH_3$, a minor amount of $H_2S$, and $H_2O$ is recovered via line 20, a bottom stream comprising liquid elemental sulfur is withdrawn via line 22 and a side stream comprising an aqueous solution of $(NH_4)_2S_2O_3$ and $NH_4OH$ is withdrawn via line 21. In this case, the sulfur recovery zone is the bottom of the distillation column. The resulting elemental sulfur-free aqueous stream containing a minor amount of ammonium thiosulfate is withdrawn from separating system 19 via line 21, commingled with a carbon monoxide stream at the junction of line 28 with line 21, and the resulting mixture is passed into reduction zone 23. The amount of carbon monoxide commingled with this aqueous stream is sufficient to provide a mole ratio of 5.6 moles of carbon monoxide per mole of $(NH_4)_2S_2O_3$. An analysis of the aqueous stream containing a minor amount of $(NH_4)_2S_2O_3$ withdrawn from separating system 19 via line 21 shows it to contain about 0.2 wt. percent sulfur as $(NH_4)_2S_2O_3$, and about 4 moles of $NH_4OH$ per mole of $(NH_4)_2S_2O_3$.

Reduction zone 23 contains a reduction catalyst comprising cobalt sulfide combined with an activated carbon carrier material. The catalyst is utilized in a particle size of about 12–20 mesh and contains 1 wt. percent cobalt on an elemental basis. The reduction catalyst is supported in reduction zone 23 as a fixed bed and the mixture of carbon monoxide and the thiosulfate-containing aqueous stream are passed in downflow fashion over the catalyst. The conditions utilized in reduction zone 23 are: a temperature of 200° C. a pressure of 500 p.s.i.g., and a liquid hourly space velocity of 1 hr.$^{-1}$.

An effluent stream is withdrawn from reduction zone 23 via line 25 and passed to separating zone 26 wherein a gaseous phase separates from a liquid aqueous phase. The gaseous phase comprises unreacted CO, $CO_2H_2S$, $NH_3$ and $H_2O$. It is withdrawn from separating zone 26 via line 29 and vented from the system. The aqueous phase formed in separating zone 26 is withdrawn via line 27 and recycled via line 27 and line 9 back to the water-contacting step of the hydrocracking process. An analysis of the treated water stream flowing through line 27 shows that 99% of the ammonium thiosulfate charged to zone 23 is converted therein at a selectivity for sulfide of about 98%. Accordingly, this stream is substantially free of thiosulfate.

Operations as described are continued for a hydrocracking catalyst life of about 20 barrels per pound of catalyst and the hydrocarbon products stream recovered via line 12 remains substantially free of elemental sulfur and there is no significant aqueous waste stream disposal problem. Therefore, a waste water disposal pollution problem has been abated, elemental sulfur has been recovered from the waste water stream, the hydrocarbon products stream remains free of elemental sulfur, and the loop is closed with respect to recycle water.

It is intended to cover by the following claims all changes and modifications of the above disclosure of the present invention that would be self-evident to one of ordinary skill in the water treating art.

We claim as our invention:

1. A method for treating an input water stream containing an ammonium sulfide compound to produce sulfur and a treated water stream which is substantially free of ammonium thiosulfate, said method comprising the steps of:

(a) catalytically treating the input water stream with oxygen at oxidizing conditions selected to form an effluent stream containing $NH_4OH$ and $(NH_4)_2S_2O_3$ and elemental sulfur or ammonium polysulfide;

(b) separating sulfur from the effluent stream produced in step (a) to form a water stream containing $(NH_4)_2S_2O_3$; and (c) treating the water stream from step (b) with carbon monoxide at reduction conditions selected to form a substantially thiosulfate-free treated water stream.

2. A method as defined in claim 1 wherein step (a) comprises contacting the input water stream and oxygen with a phthalocyanine catalyst at oxidizing conditions selected to produce an effluent stream containing $$NH_4OH(NH_4)_2S_2O_3$$

and elemental sulfur or ammonium polysulfide.

3. A method as defined in claim 1 wherein step (a) comprises contacting the input water stream and oxygen with a catalyst comprising an iron group metallic sulfide combined with a carrier material at oxidizing conditions selected to produce an effluent stream containing $NH_4OH$, $(NH_4)_2S_2O_3$ and elemental sulfur or ammonium polysulfide.

4. A method as defined in claim 1 wherein the reduction conditions utilized in step (c) include a temperature of about 70° C. to about 350° C., and a pressure sufficient to maintain at least a portion of the water stream from step (b) in the liquid phase.

5. A method as defined in claim 1 wherein carbon monoxide is utilized in step (c) in an amount sufficient to provide a mole ratio of carbon monoxide to ammonium thiosulfate of at least 4:1.

6. A method as defined in claim 1 wherein the input water stream contains about 0.1 to about 20 wt. percent of the ammonium sulfide compound.

7. A method as defined in claim 1 wherein step (c) is performed by contacting the water stream from step (b) and carbon monoxide with a catalyst at reduction conditions selected to produce a substantial thiosulfate-free effluent stream.

8. A method as defined in claim 7 wherein said catalyst utilized in step (c) is activated carbon.

9. A method as defined in claim 7 wherein said catalyst utilized in step (c) comprises a combination of a metallic component selected from the group consisting of the metals and compounds of the transition metals of groups VI and VIII with a porous carrier material.

10. A method as defined in claim 9 wherein said metallic component of said catalyst is cobalt sulfide.

11. A method as defined in claim 9 wherein said metallic component of said catalyst is molybdenum sulfide.

12. A method as defined in claim 9 wherein said metallic component of said catalyst is tungsten sulfide.

13. A method as defined in claim 9 wherein said porous carrier material is activated carbon or a refractory inorganic oxide.

14. A method as defined in claim 1 wherein a water-immiscible sulfur solvent is also charged to step (a) and wherein step (b) comprises separating the effluent stream from step (a) into a sulfur solvent phase containing sulfur and an aqueous phase containing $NH_4OH$ and $$(NH_4)_2S_2O_3$$

15. A method as defined in claim 1 wherein step (a) is operated so that the amount of oxygen reacted therein corresponds to a mole ratio of oxygen to ammonium sulfide of less than 0.5:1 to produce an aqueous effluent stream containing ammonium polysulfide, $NH_4OH$ and $(NH_4)_2S_2O_3$ and wherein step (b) comprises: subjecting the effluent stream from step (a) to polysulfide decomposition conditions selected to produce an overhead stream containing $H_2S$, $NH_3$ and $H_2O$ and a bottom water stream containing sulfur and $(NH_4)_2S_2O_3$, and separating sulfur from the bottom water stream to form the water stream containing $(NH_4)_2S_2O_3$.

16. A method for treating an input water stream containing $NH_4HS$ to produce elemental sulfur and a substantially ammonium thiosulfate-free treated water stream, said method comprising the steps of:

(a) contacting the input water stream and an amount of oxygen sufficient to react less than 0.5 mole of oxygen per mole of $NH_4HS$ contained in said input water stream with a phthalocyanine catalyst at oxidizing conditions selected to produce an effluent stream containing ammonium polysulfide, $NH_4OH$, and $(NH_4)_2S_2O_3$;

(b) subjecting the effluent stream formed in step (a) to polysulfide decomposition conditions effective to produce an overhead stream containing $NH_3$, $H_2S$ and $H_2O$, and an aqueous bottom stream containing elemental sulfur and $(NH_4)_2S_2O_3$;

(c) separating sulfur from the bottom stream produced in step (b) to form an aqueous stream containing $(NH_4)_2S_2O_3$;

(d) contacting the aqueous stream from step (c) and carbon monoxide with a reduction catalyst, comprising cobalt sulfide combined with a carrier material, at reduction conditions, including a temperature of about 70 to about 350° C. and a pressure sufficient to maintain at least a portion of the aqueous stream from step (c) in the liquid phase, to form a substantial thiosulfate-free effluent stream containing $CO_2$, $H_2S$ and an aqueous solution of $NH_4HS$ and $(NH_4)_2CO_3$; and (e) separating $CO_2$ and $H_2S$ from the effluent stream from step (d) to produce a treated water stream which is substantially free of $(NH_4)_2S_2O_3$.

17. A method as defined in claim 15 wherein said carbon monoxide is utilized in step (d) in an amount sufficient to provide a mole ratio of carbon monoxide to ammonium thiosulfate of at least 4:1.

18. A method as defined in claim 15 wherein said reduction catalyst comprises cobalt sulfide combined with activated carbon or charcoal.

References Cited

UNITED STATES PATENTS 3,536,619  10/1970  Urban et al. _____ 23—224 X
1,636,106  7/1927  Naef _____ 23—137

OTHER REFERENCES

Partington, J. R.: A Textbook of Inorganic Chemistry, sixth edition, Macmillan Co., London, 1950.

OSCAR R. VERTIZ, Primary Examiner

G. O. PETERS, Assistant Examiner

U.S. Cl. X.R.

210—50